United States Patent Office 3,706,783
Patented Dec. 19, 1972

3,706,783
AUTO-OXIDATION OF ALDEHYDES IN THE
PRESENCE OF CHLOROFORMATES
Richard Anthony Bafford, Aiken, S.C., assignor to
Pennwalt Corporation, Philadelphia, Pa.
No Drawing. Original application Apr. 18, 1968, Ser. No.
722,166, now Patent No. 3,580,955, dated May 25,
1971. Divided and this application Mar. 18, 1971, Ser.
No. 125,894
Int. Cl. C07c 73/00; C08f 1/60
U.S. Cl. 260—463 5 Claims

ABSTRACT OF THE DISCLOSURE

Peroxy compounds are prepared by reacting free-oxygen, an aldehyde, an organic compound containing active halogen and an acid acceptor, under anhydrous conditions, at a temperature below the decomposition temperature of the desired acylperoxy product.

Benzoyl n-butyryl peroxide prepared by reacting free-oxygen, n-butyraldehyde, benzoyl chloride and sodium carbonate, in benzene solution, under anhydrous conditions, under illumination, at a temperature of 30–35° C.

CROSS REFERENCE TO RELATED APPLICATION

This is a divisional of application S.N. 722,166, filed Apr. 18, 1968 now U.S. Pat. No. 3,580,955 issued May 25, 1971.

BACKGROUND OF THE INVENTION (1) Field of the invention

This invention relates to peroxy compounds and to a process for preparing these. More particularly the invention relates to the preparation of peroxy compounds from aldehydes and organic halogen compounds; acylperoxy compounds are of particular interest.

(2) The prior art

There exists a considerable body of art on the preparation of symmetrical and unsymmetrical diacyl peroxides by the oxidation of aldehydes in the presence of anhydrides (References 1–5). This process can be used to prepare peroxides in classes (hereinafter defined) 1 to 4 only. However, this process has several disadvantages, the most notable being that it is uneconomic. Only the relatively simple anhydrides are commercially available; more complex anhydrides are usually made via the acid chlorides. [Since in this process, described herein, the acid chlorides can be used directly, one step of the process is thereby eliminated.] In addition, the by-product is the carboxylic acid which must be recovered and converted back to anhydride or else discarded at an economic loss. [In our process, the by-product is hydrogen halide (usually obtained as the sodium or potassium salt), a very low price by-product which can be discarded.]

It is known that unsymmetrical diacyl peroxides are rapidly converted to symmetrical diacyl peroxides in the presence of sodium carbonate, sodium hydroxide or pyridine (4c, 6). For example, if acetyl benzoyl peroxide is contacted with dilute sodium carbonate solution at room temperature for 4–5 hours, it is completely converted to benzoyl peroxide, acetic acid and peracetic acid (6). Thus, it would appear that unsymmetrical diacyl peroxides could not be prepared in the presence of bases, like sodium carbonate.

The previously described reaction of unsymmetrical diacyl peroxides with aqueous bases to give symmetrical diacyl peroxides is of no commercial value, since it requires two moles of unsymmetrical peroxides to give one mole of symmetrical diacyl peroxide.

Peroxides of classes 1 to 4 can be prepared by the action of peracids with anhydrides or acid chlorides in the presence of an acid acceptor (7, 8, 9, 10, 11). In all these cases, the products were derived from perbenzoic or substituted perbenzoic acids. The reason for this is that the preparation of pure aliphatic peracids is tedious, time consuming and hazardous. Aliphatic peracids, because of their manner of preparation, always contain a considerable amount of the corresponding carboxylic acid. This is usually not removed since it reduces the hazardous nature of the peracid by dilution. However, in order to prepare pure diacyl peroxides from aliphatic peracids, the carboxylic acid must be absent.

Peroxides of classes 5 and 6 (hereinafter defined) have been prepared by the action of chloroformates on peracids in the presence of an acid acceptor (12, 13). This procedure suffers from the disadvantage that a pure peracid must be available. Only products derived from perbenzoic acid derivatives and relatively safe long chain fatty peracids have been prepared.

Peroxides of classes 8, 9, 10, 12 and 13 (hereinafter defined) can also be prepared from peracids, again with the attendant difficulties encountered in using peracids (14).

PRIOR ART REFERENCES (1) W. R. Jorissen, Z. physik. Chem., 22, 34 (1897).
(2) P. A. A. van der Beek, Rec. trav. Chim., 51, 411 (1932).
(3) C. Walling and E. A. McElhill, J. Am. Chem. Soc., 73, 2927 (1951).
(4) (a) Yu. A. Ol'dekop et al., J. Gen. Chem. (U.S.S.R.), 31, 2706 (1961) (English edition).
(b) Yu. A. Ol'dekop et al., J. Gen. Chem. (U.S.S.R.), 33, 2699 (1963) (English edition).
(c) Yu. A. Ol'dekop et al., J. Org. Chem. (U.S.S.R.), 1, 80 (1965).
(d) Yu. A. Ol'dekop et al., J. Org. Chem. (U.S.S.R.), 2, 2133 (1966).
(5) A. Pajaczkowski and J. W. Spoors, Brit. pat. 958,067 (1964).
(6) Yu. A. Ol'dekop and A. P. El'nitskii, J. Gen. Chem. (U.S.S.R.), 34, 3520 (1964) (English edition).
(7) G. Schroeder and R. Lombard, Bull. Soc. Chim. France, 542 (1964).
(8) A. Baeyer and V. Villiger, Ber., 33, 1569 (1900).
(9) H. Wieland and G. Rasuwajew, Annalen, 480, 157 (1930).
(10) Cooper, J. Chem., Soc., 3106 (1951).
(11) Swain et al., Am. Chem. Soc. 72, 5426 (1950).
(12) A. Pajaczkowski and J. Turner, Brit. pat. 870,584 (1961).
(13) G. A. Razuvaev et al., Izv. Akad. Nauk SSSR, Ser. Khim. 426 (1964).
(14) V. Likhterov et al., Vysokomol. soedin. 4, 357 (1962).

SUMMARY OF THE INVENTION

It has been discovered that when moisture is rigidly excluded from the reaction of an aldehyde, free-oxygen, reactive halogen compound and acid acceptor, such as sodium carbonate, the unsymmetrical diacyl peroxides are prepared in high yield and high purity and that symmetrical diacyl peroxide is absent from the reaction product. It is emphasized that moisture must be excluded at all times while the peroxide is in contact with acid acceptor, such as sodium carbonate. However, once the peroxide is physically freed from sodium carbonate by filtration or centrifugation, the peroxide may be washed with water, dilute aqueous acids or dilute aqueous ammonia without formation of the symmetrical peroxide.

The process of the invention for preparing peroxy compounds comprises, under anhydrous conditions, introducing free-oxygen into an intimate mixture of an aldehyde, an organic active halogen compound and an acid acceptor, at a temperature below the decomposition temperature of the peroxy product; and recovering from the reaction product mixture a peroxy product where (i) said aldehyde consists of at least one aldehydo group (—CHO) joined to a radical selected from the class consisting of alkyl, cycloalkyl, aryl, aralkyl, alkylene, cycloalkylene, arylene and the corresponding substituted radicals which radicals are inert to said halogen compound and are free of olefinic bonds; (ii) said organic active halogen compound is selected from the class consisting of acyl halides, poly(acylhalides), hydrocarbon haloformates, poly(hydrocarbon haloformates) phosgenes, sulfonyl halides, organometallic halides and organophosphoryl halides, said halogen compound being free of olefinic bonds, and said halogen is selected from the class consisting of bromine, chlorine and fluorine; and (iii) said acid acceptor is present in the reaction zone to promote the oxidation reaction and to react with the hydrogen halides released during the a peroxy compound formation reaction and is selected so as to react without producing free-water, thereby maintaining the anhydrous condition of the reaction zone.

In another aspect the invention is a process for preparing a peroxy compound of the class having the formula,

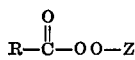

where:

(i) 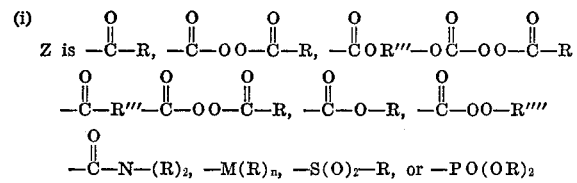

(ii) M is a metal capable of having a valence of at least 2;
(iii) $n$ is equal to the valence of M minus 1;
(iv) R is alkyl, cycloalkyl, aralkyl, aryl, or a corresponding substituted radical;
(v) R''' is alkylene, cycloalkylene, phenylene, or a corresponding substituted radical;
(vi) R'''' is alkyl, cycloalkyl, aralkyl, or a corresponding substituted radical; and
(vii) aforesaid radicals are inert with respect to the reaction and are free of olefinic bonds;

by, under anhydrous conditions, introducing free-oxygen into an intimate mixture of (a) an aldehyde, (b) an organic active halogen compound, where halogen is bromine, chlorine or fluorine, and (c) an acid acceptor, maintained at a temperature below that at which the peroxy product decomposes at an appreciable rate, said aldehyde and said halogen compound being capable of affording, in conjunction with said oxygen, the defined a peroxy product, and said acid acceptor is present as a promoter as well as a reactant for the hydrogen halide released in the reaction and is capable of such reaction without producing free water, thereby maintaining the anhydrous condition of the reaction zone.

Illustrations: Benzoyl n-butyryl peroxide is prepared by introducing oxygen into an intimate mixture of n-butyraldehyde, benzoyl chloride and sodium carbonate in benzene solvent, under anhydorus conditions and in the presence of illumination while maintaining the reaction temperature at 30–35° C. until oxygen absorption ceases.

O,O-Benzoyl O-benzyl monoperoxycarbonate is prepared by introducing oxygen into an intimate mixture of benzaldehyde, benzyl chloroformate and sodium carbonate in benzene solvent, under anhydrous conditions and in the presence of illumination while maintaining the reaction temperature at 15–25° C. until oxygen absorption ceases.

DESCRIPTION OF THE INVENTION AND EXAMPLES

The process of the invention comprises adding free-oxygen or air to an agitated mixture of aldehyde, organic active halogen compound and acid acceptor, under anhydrous conditions. Preferably oxygen is added until no more is absorbed.

The operating temperature is dictated by the thermal stability of the product peroxide, i.e., decomposition temperature. For example, benzoyl n-butyryl peroxide is prepared preferably at 35–45° C., while benzoyl isobutyryl peroxide is prepared preferably at —5 to +5° C. Since the rate of oxidation of the aldehyde is temperature dependent, the reaction temperature is chosen so as to give a balance of maximum oxidation rate and minimum thermal decompoistion of the product peroxide. Desirably the operating tempeature range is not more than about +50° C. and is usually above about —25° C. The optimum temperature for a particular reaction system is dictated by the particular peroxidic product to be prepared.

Some peroxide product will be made regardless of the ratio of aldehyde and organic active halogen compound present. It is usual to operate with at least the theoretical ratio of one aldehydo (—CHO) group present for each active halo (—X) group present. It is preferred to operate with a slight excess of aldehydo to halo, e.g., about 1.1:1 mole ratio. In the case of monoaldehyde and organic mono-active halogen compound, the broadly desirable operating range is about 2:1 to 0.5:1. In the case of a monoaldehyde and an organic mono-active halogen compound the preferred mole ratio, on a compound basis, is about 1.1:1 to 1:1.

Although on paper it would appear that the acid acceptor functions solely to react with acid released from the reaction of aldehyde and halogen compound the peroxide product is not obtained in the absence of an acid acceptor.

The acid acceptor is selected not only for its ability to react with the hydrogen halide released during the peroxy compound formation reaction but also for its ability to so react without producing free-water—the anhydrous condition of the reaction zone must be maintained. To illustrate: For economic reasons, a preferred acid acceptor is sodium carbonate. In one course of acid neutralization, water is a by-product (see B). However by using the proper amount of carbonate, the formation of water can be avoided (see A).

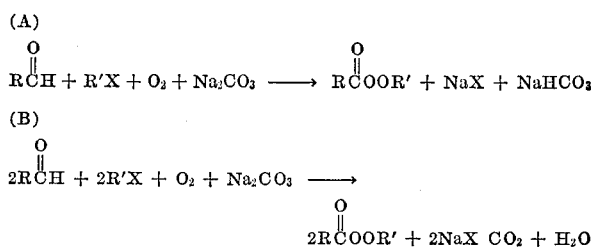

Thus, although the carbonates are dibasic salts, at least one mole of carbonate per mole of reactive halogen compound must be used to prevent formation of water as shown by equation A.

The preferred classes of acid acceptors are the alkali metal carbonates, the alkaline earth metal carbonates and the basic (alkaline reacting) organic ion exchange resins. Magnesium oxide and zinc oxide are preferred metal oxide acid acceptors. Typical suitable anion exchangers are Amberlite IRA series, Duolite A series, De-Acidite resins.

Sufficient acid acceptor is present to react with the hydrogen halide released in the reaction. An excess may be present such as 1.5:1; it is preferred to operate with a slight excess of acceptor, e.g. up to about 1.1:1.

The reaction may be carried out in the presence of an inert organic solvent such as aromatic hydrocarbons, alkanes, petroleum hydrocarbons, alkyl esters, etc. Illustrative are benzene, toluene, special light naphtha, odorless mineral spirits, ethyl acetate and acetonitrile. The higher-boiling solvents are used where it is desired to handle and store the product peroxide in diluted form.

In order to accelerate the rate of oxidation of the aldehyde, it is sometimes advantageous to illuminate the reaction mixture. For aromatic aldehydes, an incandescent lamp may be used and for aliphatic aldehydes, a sun lamp may be used. The oxidation can also be accelerated by raising the operating temperature; however, the thermal stability of the peroxide being prepared must be considered. Another method for accelerating the oxidation consists of adding catalytic quantities of low-temperature free-radical initiators such as diisobutyryl peroxide, diisopropyl peroxydicarbonate or acetyl cyclohexanesulfonyl peroxide. In most cases, however, additives to accelerate the oxidation are unnecessary.

In a typical oxidation, where sodium carbonate is used as the acid acceptor, the reaction product mixture is worked up in the following manner: The inorganic salts are removed by filtration or centrifugation. The filtrate is then vacuum stripped to remove solvent and unreacted reagents. The stripped peroxidic residue usually assays better than 90% without purification. For further purification, solid peroxides can be recrystallized from suitable solvents. Liquid peroxides are purified by washing with suitable aqueous solution; for example 10% aqueous sodium bisulfite solution can be used to remove unreacted aldehydes; unreacted acyl halides, chloroformates or sulfonyl halides are first hydrolyzed by washing with a 5% aqueous sulfuric acid solution, then hydrolyzed products are extracted by washing the organic phase with 3% aqueous ammonia. Sodium bicarbonate wash solution can also be used, however, stronger bases such as sodium carbonate or sodium hydroxide should not be used, especially with unsymmetrical diacyl peroxides.

Reactive halogen compounds are especially undesirable impurities in peroxides used as polymerization initiators. Unexpectedly, I generally find very low levels (<0.1% Cl) of reactive halogen compounds in many of our unpurified peroxides. However, if oxidation is not run to completion, then the purification procedures described above can be used to remove reactive halogen compounds.

The aldehyde reactants

The only limitations on the aldehyde are that it contains no substituents, such as hydroxyl or amino groups, which could react with the reactive halogen compound. Also, the aldehydes should contain no olefinic unsaturation, since such compounds tend to inhibit the oxidation, presumably due to reactions of the double bond with free radicals generated during the oxidation.

Illustrative mono aldehydes, by class, are set out below:

| R = (Class) | Aldehyde |
| --- | --- |
| Alkyl | Acetaldehyde, butyraldehyde, isobutyraldehyde, isovaleraldehyde, 2-ethylhexaldehyde, lauraldehyde. |
| Cycloalkyl | Cyclohexanecarboxaldehyde, 2-methylcyclohexanecarboxaldehyde, 2-methylcyclopentanecarboxaldehyde, cyclohexyl acetaldehyde, cyclopentane aldehyde. |
| Substituted alkyl | 4-chlorobutyraldehyde, perfluorobutyraldehyde, tetrabromobutyraldehyde. |
| Substituted cycloalkyl | 3-chlorocyclohexanecarboxaldehyde, 1-phenylcyclopentane-1-carboxaldehyde. |
| Aryl | Benzaldehyde, tolualdehyde, p-isopropylbenzaldehyde, dimethylbenzaldehyde. |
| Substituted aryl | Anisaldehyde, o-chlorobenzaldehyde, p-nitrobenzaldehyde, o-fluorobenzaldehyde, piperonal. |
| Aralkyl | 3-phenylpropionaldehyde; phenylacetaldehyde, phenylbutyraldehyde. |

Illustrative dialdehydes are: glyoxal, butanedial, octanedial, 1,13-tridecanedial, glutaraldehyde, terephthaldehyde, o-phthalaldehyde.

Preferred radicals (R) are: alkyl having 1–22 carbon atoms; cycloalkyl having 5–6 carbon atoms in the ring; phenyl; phenalkyl with 1–12 carbons in the alkyl portion and the corresponding substituted radicals, a preferred substituent is a halo atom(s).

Organic reactive halogen compounds

The reactive halogen compound should contain no olefinic unsaturation since such compounds tend to inhibit the oxidation presumably due to reactions of the double bond with free radicals generated during the oxidation.

Illustrative reactive halogen compounds are, as set out by class and species.

| Class | Formula | Species |
| --- | --- | --- |
| Acyl halides | $R''\overset{O}{\underset{\|}{C}}-X$ | Acetyl chloride, butyryl chloride, isobutyryl chloride, benzoyl chloride, cyclohexanecarbonyl chloride, isovaleryl chloride, anisoyl chloride, m-trifluoromethylbenzoyl fluoride, o-chlorobenzoyl chloride, p-nitrobenzoyl chloride, 4-chlorobutyryl chloride, m-bromobenzoyl bromide. |
| Haloformates | $R''O\overset{O}{\underset{\|}{C}}X$ | Isobutyl chloroformate, methyl chloroformate, 2-ethylhexyl chloroformate, benzyl chloroformate, phenyl chloroformate, cyclohexyl chloroformate, 3,3,5-trimethylcyclohexyl chloroformate, 4-t-butylcyclohexyl chloroformate, p-chlorophenyl chloroformate. |
| Phosgene | $X\overset{O}{\underset{\|}{C}}X$ | Fluorophosgene, phosgene. |
| Sulfonyl halides | $R''SO_2X$ | Methanesulfonyl chloride, 1-butanesulfonyl chloride, benzenesulfonyl chloride, p-nitrobenzenesulfonyl chloride. |
| Organometallic halides | $(R'')_m M X_m$ | Trimethylchlorosilane, diphenyldichlorosilane, ethyltrichlorosilane, trimethyl lead chloride. |
| Organophosphoryl halides | $(R''O)_{3-m}\overset{O}{\underset{\|}{P}}X_m$ | Dibutylchlorophosphate, dioctylchlorophosphate. |
| Bis(acylhalides) | $X\overset{O}{\underset{\|}{C}}R'''\overset{O}{\underset{\|}{C}}X$ | Succinyl chloride, terephthaloyl chloride, orthophthaloyl chloride. |
| Bis(haloformates) | $X\overset{O}{\underset{\|}{C}}OR'''O\overset{O}{\underset{\|}{C}}X$ | m-Phenylene bis(chloroformate), 1,4 butylene bis(chloroformate). |
| Carbamyl halides | $(R)_2-N-\overset{O}{\underset{\|}{C}}-X$ | N,N-dimethylcarbamyl chloride, N,N-diisobutylcarbamyl chloride. | where R, R'', R''', X and M are as defined hereinbefore.

Various types of peroxides can be prepared by the process of the invention. The major types are listed in the following Table 1, where the names are controlling—the structure may be a generalized presentation.

Type 1

Symmetrical unsubstituted diacyl halides: $R\overset{O}{\overset{\|}{C}}OO\overset{O}{\overset{\|}{C}}R''$ Benzoyl peroxide (I)    $\Phi-\overset{O}{\overset{\|}{C}}-OO-\overset{O}{\overset{\|}{C}}-\Phi$ di-n-Butyryl peroxide (II)    $C_3H_7-\overset{O}{\overset{\|}{C}}-OO-\overset{O}{\overset{\|}{C}}-C_3H_7$ Type 2

Symmetrical substituted diacyl peroxides: $R\overset{O}{\overset{\|}{C}}OO\overset{O}{\overset{\|}{C}}R''$ di-Anisoyl peroxide (III)    $CH_3O-\Phi-\overset{O}{\overset{\|}{C}}-OO-\overset{O}{\overset{\|}{C}}-\Phi-OCH_3$ Bis(4-chlorobutyryl) peroxide (IV)    $Cl(CH_2)_3-\overset{O}{\overset{\|}{C}}-OO-\overset{O}{\overset{\|}{C}}-(CH_2)_3Cl$ Type 3

Unsymmetrical unsubstituted diacyl peroxides: $R\overset{O}{\overset{\|}{C}}OO\overset{O}{\overset{\|}{C}}R''$ Acetyl benzoyl peroxide (V)    $\Phi-\overset{O}{\overset{\|}{C}}-OO-\overset{O}{\overset{\|}{C}}-CH_3$ Benzoyl isobutyryl peroxide (VI)    $\Phi-\overset{O}{\overset{\|}{C}}-OO-\overset{O}{\overset{\|}{C}}-\overset{CH_3}{\underset{CH_3}{C-H}}$ Acetyl isononanoyl peroxide (VII)    $CH_3-\overset{O}{\overset{\|}{C}}-OO-\overset{O}{\overset{\|}{C}}-CH_2-\overset{CH_3}{\underset{}{CH}}-CH_2-C(CH_3)_3$ Type 4

Unsymmetrical substituted diacyl peroxides: $R\overset{O}{\overset{\|}{C}}OO\overset{O}{\overset{\|}{C}}R''$ Benzoyl-m-trifluoromethyl benzoyl peroxide (VIII)    $CF_3-\Phi-\overset{O}{\overset{\|}{C}}-OO-\overset{O}{\overset{\|}{C}}-\Phi$ o-Chlorobenzoyl m-chlorobenzoyl peroxide (IX)    $Cl-\Phi-\overset{O}{\overset{\|}{C}}-OO-\overset{O}{\overset{\|}{C}}-\Phi-Cl$ Cuminoyl isononanoyl peroxide (X)    $H\overset{CH_3}{\underset{CH_3}{C}}-\Phi-\overset{O}{\overset{\|}{C}}-OO-\overset{O}{\overset{\|}{C}}-CH_2-\overset{CH_3}{\underset{}{CH}}-CH_2-C(CH_3)_3$ Type 5

O,O-Acyl O-alkyl monoperoxycarbonates: $R\overset{O}{\overset{\|}{C}}OO\overset{O}{\overset{\|}{C}}OR''$ O,O-Benzoyl O-isopropyl monoperoxycarbonate (XI)    $\Phi-\overset{O}{\overset{\|}{C}}OO\overset{O}{\overset{\|}{C}}OCH(CH_3)_2$ O,O-Butyryl O-isopropyl monoperoxycarbonate (XII)    $C_3H_7\overset{O}{\overset{\|}{C}}OO\overset{O}{\overset{\|}{C}}OCH(CH_3)_2$ Type 6

O,O-Acyl O-aryl monoperoxycarbonates: $R\overset{O}{\overset{\|}{C}}OO\overset{O}{\overset{\|}{C}}OR''$ O,O-Benzoyl O-phenyl monoperoxycarbonate (XIII)    $\Phi-\overset{O}{\overset{\|}{C}}OO\overset{O}{\overset{\|}{C}}O-\Phi$ O,O-Butyryl O-phenyl monoperoxycarbonate (XIV)    $C_3H_7\overset{O}{\overset{\|}{C}}OO\overset{O}{\overset{\|}{C}}O-\Phi$ Type 7

O,O-Acyl O-aralkyl monoperoxycarbonate: $R\overset{O}{\overset{\|}{C}}OO\overset{O}{\overset{\|}{C}}OR''$ O,O-Benzoyl O-benzyl monoperoxycarbonate (XV)    $\Phi-\overset{O}{\overset{\|}{C}}OO\overset{O}{\overset{\|}{C}}OCH_2-\Phi$ O,O-Acetyl O-benzyl monoperoxycarbonate (XVI)    $CH_3\overset{O}{\overset{\|}{C}}OO\overset{O}{\overset{\|}{C}}OCH_2-\Phi$

Type 8

Acyl peroxycarbamates: $R\overset{O}{\underset{\|}{C}}OO\overset{O}{\underset{\|}{C}}N\begin{smallmatrix}R''\\R''\end{smallmatrix}$ Benzoyl N,N-dimethyl-carbamoyl peroxide  (XVII)  $\Phi-\overset{O}{\underset{\|}{C}}OO\overset{O}{\underset{\|}{C}}N\begin{smallmatrix}CH_3\\CH_3\end{smallmatrix}$ Butyryl N,N-dimethyl-carbamoyl peroxide  (XVIII)  $C_3H_7\overset{O}{\underset{\|}{C}}OO\overset{O}{\underset{\|}{C}}N\begin{smallmatrix}CH_3\\CH_3\end{smallmatrix}$

Type 9

Acyl alkylsulfonyl peroxides: $R\overset{O}{\underset{\|}{C}}OO\overset{O}{\underset{\|}{\underset{O}{S}}}R''$ Benzoyl methylsulfonyl peroxide  (XIX)  $\Phi-\overset{O}{\underset{\|}{C}}OO\overset{O}{\underset{\|}{\underset{O}{S}}}CH_3$ Butyryl n-butylsulfonyl peroxide  (XX)  $C_3H_7\overset{O}{\underset{\|}{C}}OO\overset{O}{\underset{\|}{\underset{O}{S}}}C_4H_9$ Benzoyl benzenesulfonyl peroxide  (XXI)  $\Phi-\overset{O}{\underset{\|}{C}}OO\overset{O}{\underset{\|}{\underset{O}{S}}}-\Phi$

Type 10

Acyl peroxyphosphates: $R\overset{O}{\underset{\|}{C}}OO\overset{O}{\underset{\|}{P}}(OR'')_2$ O,O-Benzoyl di(O-butyl) monoperoxyphosphate  (XXII)  $\Phi-\overset{O}{\underset{\|}{C}}-OO-\overset{O}{\underset{\|}{P}}-(OC_4H_9)_2$

Type 11

Organometallic peresters: $R\overset{O}{\underset{\|}{C}}OOM(R'')_3$

Trimethylsilyl peroxy-butyrate  (XXIII)  $C_3H_7\overset{O}{\underset{\|}{C}}OO\underset{\underset{CH_3}{|}}{\overset{\overset{CH_3}{|}}{Si}}-CH_3$ Trimethylsilyl peroxy-benzoate  (XXIV)  $\Phi-\overset{O}{\underset{\|}{C}}OO\underset{\underset{CH_3}{|}}{\overset{\overset{CH_3}{|}}{Si}}-CH_3$

Type 12

Diacyl diperoxycarbonates: $R\overset{O}{\underset{\|}{C}}OO\overset{O}{\underset{\|}{C}}OO\overset{O}{\underset{\|}{C}}R$ Dibenzoyl diperoxy-carbonate  (XXV)  $\Phi-\overset{O}{\underset{\|}{C}}OO\overset{O}{\underset{\|}{C}}OO\overset{O}{\underset{\|}{C}}-\Phi$ Dibutyryl diperoxy carbonate  (XXVI)  $C_3H_7\overset{O}{\underset{\|}{C}}OO\overset{O}{\underset{\|}{C}}OO\overset{O}{\underset{\|}{C}}C_3H_7$

Type 13

O,O-Acyl O,O-alkyl diperoxy carbonate: $R\overset{O}{\underset{\|}{C}}OO\overset{O}{\underset{\|}{C}}OOR''''$ O,O-Benzoyl O,O-t-butyl diperoxycarbonate  (XXVII)  $\Phi-\overset{O}{\underset{\|}{C}}OO\overset{O}{\underset{\|}{C}}OOC(CH_3)_3$

Type 14

Bis(diacyl peroxides): $R\overset{O}{\underset{\|}{C}}OO\overset{O}{\underset{\|}{C}}R'''\overset{O}{\underset{\|}{C}}OO\overset{O}{\underset{\|}{C}}R$ Dibenzoyl succinoyl diperoxide  (XXVIII)  $\Phi-\overset{O}{\underset{\|}{C}}OO\overset{O}{\underset{\|}{C}}CH_2CH_2\overset{O}{\underset{\|}{C}}OO\overset{O}{\underset{\|}{C}}-\Phi$ Dibenzoyl terephthaloyl diperoxide  (XXIX)  $\Phi-\overset{O}{\underset{\|}{C}}-OO\overset{O}{\underset{\|}{C}}-\Phi-\overset{O}{\underset{\|}{C}}-OO-\overset{O}{\underset{\|}{C}}-\Phi$ where: R, R'', R''', R'''' and M have the definition hereinbefore given, and $\Phi = $ 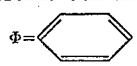

Compounds

The process of the invention is capable of making a wide range of peroxy compounds. Illustrative are the following compounds which are known to this art.

Benzoyl butyryl peroxide
Benzoyl isobutyryl peroxide
Acetyl benzoyl peroxide
Acetyl benzoyl peroxide
Di-n-butyryl peroxide
O,O-benzoyl O-phenyl monoperoxycarbonate
Benzoyl peroxide
O,O-benzoyl O-isopropyl monoperoxycarbonate
Acetyl p-anisoyl peroxide
Acetyl hexahydrobenzoyl peroxide
Acetyl 2-ethylhexanoyl peroxide
Acetyl isononanoyl peroxide
Acetyl lauroyl peroxide
Benzoyl propionyl peroxide
Dibenzoyl succinoyl diperoxide
Benzoyl methylsulfonyl peroxide
Benzoyl ethylsulfonyl peroxide
Benzoyl propylsulfonyl peroxide
O,O-benzoyl O-methyl monoperoxycarbonate
O,O-benzoyl O-cyclohexyl monoperoxycarbonate
O,O-lauroyl O-methyl monoperoxycarbonate
O,O-lauroyl O-isopropyl monoperoxycarbonate
O,O-lauroyl O-(3,5,5, trimethylhexyl) monoperoxycarbonate
O,O-caprylyl O-isopropyl monoperoxycarbonate The process of the invention permits the preparation of compounds not previously prepared by the art. Among these novel compounds are:

Benzoyl m-trifluoromethylbenzoyl peroxide
m-Chlorobenzoyl o-chlorobenzoyl peroxide
O,O-benzoyl O-benzyl monoperoxycarbonate
O,O-n-butyryl O-isobutyl monoperoxycarbonate
O,O,-Acetyl O-benzyl monoperoxycarbonate
O,O-benzoyl O-isobutyl monoperoxycarbonate
Acetyl 2-methylundecanoyl peroxide
Acetyl 2-methylvaleryl peroxide
Benzoyl hexahydrobenzoyl peroxide
O,O-butyryl O-isopropyl monoperoxycarbonate
O,O-butyryl O-benzyl monoperoxycarbonate
O,O-butyryl O-phenyl monoperoxycarbonate
Diacetyl terephthaloyl diperoxide
Dibenzoyl terephthaloyl diperoxide
Benzoyl N,N-dimethylcarbamoyl peroxide
Benzoyl benzenesulfonyl peroxide
Anisoyl 2-ethylhexanoyl peroxide

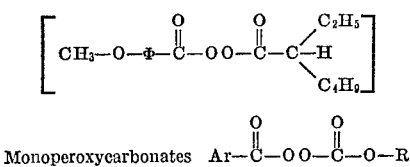

Monoperoxycarbonates 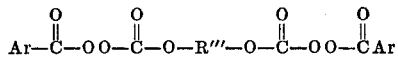

O,O-benzoyl O-(2,2-dimethylpropyl) monoperoxycarbonate
O,O-benzoyl O-(2-methylcyclohexyl) monoperoxycarbonate
O,O-benzoyl O-(3-methylcyclohexyl) monoperoxycarbonate
O,O-benzoyl O-(4-methylcyclohexyl) monoperoxycarbonate
O,O-benzoyl O-(4-t-butylcyclohexyl) monoperoxycarbonate
O,O-benzoyl O-(3,3,5-trimethylcyclohexyl) monoperoxycarbonate
O,O-benzoyl O-ethyl monoperoxycarbonate
O,O-benzoyl O-(β-methylbenzyl) monoperoxycarbonate
O,O-benzoyl O-(4-methyl-2-pentyl) monoperoxycarbonate
O,O-benzoyl O-(2,2,2-trimethylpentyl) monoperoxycarbonate Bis(monoperoxycarbonates)

1,2-bis(benzoylperoxycarbonyloxy) ethane
1,4-bis(benzoylperoxycarbonyloxy) cyclohexane
1,4-bis(benzoylperoxycarbonyloxymethyl) cyclohexane
1,3-bis(benzoylperoxycarbonyloxy)-2,2-dimethylpropane Bis(diacylperoxides) dibenzoyl isophthaloyl diperoxide $$Ar\overset{O}{\overset{\|}{C}}OO\overset{O}{\overset{\|}{C}}-Ar-\overset{O}{\overset{\|}{C}}OO\overset{O}{\overset{\|}{C}}Ar$$

Diacyl peroxide O-toluyl isovaleryl peroxide

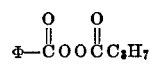

Utility

These peroxy compounds have utility in all the ways that compounds of this type have. They are efficient free radical generators. They are efficient curing agents for unsaturated polyester resins. Some have unusual properties. O,O-benzoyl O-benzyl monoperoxycarbonate is a high-melting solid with a half-life lower than t-butyl perpivalate. This is a low cost low temperature initiator not requiring refrigeration. Since it is not shock-sensitive, the pure material cna be shipped.

EXAMPLES

Numerous working examples of the process and uses of peroxides made by the process are presented. It is to be understood these examples do not limit the scope of the invention as described.

EXAMPLE I

Benzoyl n-butyryl peroxide $$\Phi-\overset{O}{\overset{\|}{C}}OO\overset{O}{\overset{\|}{C}}C_3H_7$$

A 1.5 liter jacketed resin kettle was equipped with two gas dispersion tubes, an anchor type mechanical stirrer, a thermometer and an efficient reflux condenser. The reactor was illuminated with two 275 watt Westinghouse sun lamps set at 12 inches from the reactor.

Into the reactor was charged 351.3 g. (2.5 moles) of benzoyl chloride (216 g.) (3.0 moles) of n-butyraldehyde, 296 g. (2.7 moles) of powdered sodium carbonate and 750 ml. of benzene. The apparatus was flushed with oxygen, then the lamps were turned on and oxygen introduced at a rate of 36 liters per hour. The reaction temperature was maintained at 30–35° C. by circulating water through the reactor jacket. After about 4 hours, oxygen absorption had ceased. The reaction mixture was centrifuged in a stainless steel perforated basket centrifuge. The inorganic salt cake was washed with about 750 ml. of benzene. The combined benzene solutions were passed through a wiped film evaporator at 50 mm. of mercury pressure and 30–35° C. The residue weighed 425 g. (82% of theory) and the assay by "active oxygen" content was 90.5%. The chlorine content was 0.15%. A paper chromatogram showed that benzoyl peroxide was absent. The $R_f$ value for benzoyl butyryl peroxide is 0.66 and for dibenzoyl peroxide 0.78.

The product was further purified by recrystallization from pentane at −30° to give a colorless solid melting at −5 to 0° C. and assaying 97.9% by "active oxygen" content.

The 97.9% pure benzoyl butyryl peroxide contained no benzoyl peroxide and less than 0.1% chlorine and is shock-sensitive at 5–6 inches on the Du Pont Impact Tester.

EXAMPLE II

Benzoyl n-butyryl peroxide

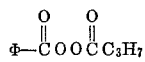

The reaction was carried out in the reactor described in Example I, using the same molar quantities of reactants except that the solvent was ethyl acetate instead of benzene. The oxidation was carried out at 32–34° and oxygen absorption ceased after about 3 hours.

The reaction mixture was filtered through a 12 inch Buchner funnel. The filter cake was washed with four 250 ml. portions of ethyl acetate. The filtrate was stripped on the wiped film evaporator. The residue weighed 450 g. (86.5% of theory) and assayed 77% on an "active oxygen" basis.

The crude product was diluted with an equal volume of pentane. To the pentane solution was added 100 ml. of 5% aqueous sulfuric acid and the mixture was stirred for 10 minutes at 0–5° C. The aqueous layer was drained off and the organic layer washed with three 100 ml. portions of 3% aqueous ammonia solution; then with water until the aqueous layer had a pH of 7. The organic layer was dried (magnesium sulfate), filtered and stripped in vacuo, leaving 338 g. of benzoyl butyryl peroxide which assayed 95% based on "active oxygen."

EXAMPLE III

Benzoyl n-butyryl peroxide

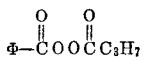

This peroxide was also prepared in 80% yield and 97.5% assay by oxidizing benzaldehyde in the presence of butyric anhydride (IVa).

However, raw material costs for benzoyl n-butyryl peroxide prepared by this process are $0.75 per pound (100% basis), while by the process described in Example I are only $0.28 per pound (100% basis).

The economic advantages of the process are obvious.

EXAMPLE VI

Benzoyl n-butyryl peroxide

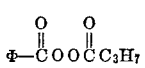

A 150 ml. jacketed reactor was equipped with a thermometer, Hershberg stirrer, gas dispersion tube and efficient reflux condenser.

Into the reactor was charged 42.2 g. (0.30 mole) of benzoyl chloride, 28.8 g. (0.40 mole) of n-butyraldehyde, 42.2 g. (0.4 mole) of sodium carbonate and 50 ml. of ethyl acetate. The reaction mixture was illuminated by a Westinghouse 275 watt sun lamp and oxygen was bubbled through the well-stirred mixture for fourteen hours. The reaction temperature was maintained at 28–30° by circulating water through the reactor jacket. The reaction mixture was filtered to remove inorganic salts and the filtrate stripped in vacuo in a rotating evaporator. The residue was taken up in 200 ml. of ether and washed with two 100 ml. portions of water, two 100 ml. portions of 3% aqueous ammonia, 100 ml. of water, two 100 ml. portions of 10% aqueous sodium bisulfite solution and finally with water until the pH was 7. The ethereal solution was dried (sodium sulfate), filtered and stripped in vacuo, leaving 41.8 g. (67% of theory) of benzoyl butyryl peroxide which assayed 96.4%. A thin layer chromatogram indicated the product to be free of benzoyl peroxide.

A duplicate run was made under identical condition except that the reaction mixture was dumped into water in order to dissolve out the inorganic salts rather than removing them by filtration. The organic phase was separated and washed as described above. The stripped product weighed 49.3 g. (78.9% of theory) and assayed 91.5% based on "active oxygen" content. However, the thin layer chromatogram of the product showed two strong spots and from their intensities it was estimated that the product contained about 50% of benzoyl peroxide.

Thus, it is obvious that during the preparation of unsymmetrical diacyl peroxides, water must be excluded until the inorganic salts are removed by filtration or centrifugation.

EXAMPLE V

Benzoyl isobutyryl peroxide

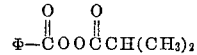

A 200 ml. jacketed reactor was equipped with a gas dispersion tube, a thermometer, a Hershberg stirrer and an efficient reflux condenser topped by a Dewar condenser containing a Dry Ice-isopropyl alcohol mixture.

Into the reactor was charged 36 g. (0.5 mole) of isobutyraldehyde, 56 g. (0.4 mole) of benzoyl chloride, 42.4 g. (0.4 mole) of sodium carbonate and 75 ml. of benzene. The reactor was illuminated by a Westinghouse 275 watt sun lamp placed twelve inches from the reactor.

Ice water was circulated through the reactor jacket in order to keep the reaction mixture temperature at 0–5° C. Oxygen was bubbled in at the rate of 1.5 liter per hour for five hours. The reaction mixture was filtered and the filter cake washed with 100 ml. of benzene. The benzene filtrate was washed at 0° with 100 ml. of water, 100 ml. of 5% aqueous sulfuric acid (stirred for 10 minutes at 0° C.), three 50 ml. portions of 3% aqueous ammonia solution, and then with water until the pH was 7. After being dried (sodium sulfate), the filtered solution was stripped at 0° on a rotating evaporator at 5 mm. pressure. The liquid residue weighed 63.5 g. (76.4% of theory) and assayed 65.8% based on active oxygen. The crude product was crystallized from pentane at −78°. The purified benzoyl isobutyryl peroxide weighed 47 g., assayed 94.5% based on "active oxygen" content, and freezes at −5 to 10° C. This peroxide is thermally unstable at room temperature and is shock sensitive at 2 inches. Benzoyl isobutyryl peroxide must be stored below −10° C. in order to maintain its assay.

EXAMPLE VI

Benzoyl m-trifluoromethylbenzoyl peroxide

The reactor described in Example IV was charged with 48 g. (0.25 mole) of m-trifluoromethylbenzoyl fluoride, 31.8 g. (0.30 mole) of benzaldehyde, 27 g. (0.25 mole) of sodium carbonate and 75 ml. of benzene. The temperature of the reaction mixture was maintained at 35–40°, while oxygen was introduced at the rate of 3.6 liters per hour for 2½ hours. The reactor was illuminated with a Westinghouse 300 watt reflector spot lamp.

When oxygen absorption ceased, the reaction mixture was filtered and the filtrate stripped in vacuo on a rotating evaporator at 5 mm. pressure. The residual oil weighed 86 g. (111% of theory) and assayed 91.5% based on active oxygen content. The yield (100% basis) was quantitative.

The oil was dissolved in 150 ml. of methylene chloride and washed at 0–5° C. with 100 ml. of water, 100 ml. of 10% sodium bisulfite solution, 100 ml. water, 100 ml. of 10% sodium bicarbonate solution and finally with 100 ml. of water. The organic layer, after being dried (2 g. of magnesium sulfate), was filtered and stripped on the rotating evaporator at 20 mm. pressure. The residue was recrystallized from pentane at −30°. The colorless crystalline product weighed 62 g. (80% of theory), assayed 100%, and melts at 41° C.

EXAMPLE VII m-Chlorobenzoyl o-chlorobenzoyl peroxide

The reactor described in Example V was charged with 87.5 g. (0.5 mole) of m-chlorobenzoyl chloride, 70.3 g. (0.6 mole) of o-chlorobenzaldehyde, 53 g. (0.5 mole) of sodium carbonate and 75 ml. of benzene. The temperature of the reaction mixture was maintained at 30–35° C., while oxygen was bubbled in at the rate of 3.6 liters per hour for four hours.

The reaction mixture was filtered through a Büchner funnel. The filter cake was slurried with 250 ml. of benzene because some of the product had crystallized from the reaction mixture and had been filtered out along with the inorganic salts. The benzene slurry was filtered and the filtrate concentrated in vacuo until the product crystallized. The crystalline product was filtered, washed well with pentane and air dried. The colorless product weighed 32.8 g., melted at 94–96° C., and assayed 99.6% based on "active oxygen."

From the original reaction mixture filtrate, there was obtained two additional crops of product weighing 26.1 g. and 14.3 g. The total yield was 74.2 g. (48% of theory).

EXAMPLE VIII

Acetyl benzoyl peroxide

Acetylbenzoyl peroxide was prepared by bubbling oxygen into a well-stirred mixture of 176 g. (4.0 moles) of acetaldehyde, 350 g. (2.5 moles) of benzoyl chloride, 276 g. (2.6 moles) of sodium carbonate and 500 ml. of benzene kept at 30° C.

The reaction mixture was worked up as described in Example I. The yellow oily product weighted 275.3 g. (61.3% of theory) and assayed 81.5% based on "active oxygen" content, and contained less than 0.1% chlorine. The product was recrystallized from water-methanol giving a colorless product melting at 37–38° and assaying 97.3%, and was shock-sensitive at one inch.

EXAMPLE IX

Di-n-butyryl peroxide

Into the reactor described in Example IV was charged 21.6 g. (0.3 mole) of n-butyraldehyde, 26.7 g. (0.25 mole) of n-butyryl chloride, 26.5 g. (0.25 mole) of sodium carbonate and 75 ml. of benzene.

The reaction mixture was maintained at 15–20° C., while oxygen was bubbled in at the rate of 3.0 liters per hour for 6½ hours. The reaction mixture was then poured into cold water in order to dissolve the inorganic salts (Note: This is a symmetical diacyl peroxide and, therefore, far less sensitive to hydrolysis under alkaline conditions). The organic layer was washed with two 100 ml. portions of water and then dried at 0° C. over 5 g. of sodium sulfate.

The benzene solution, after filtration, was stripped on a rotating evaporator at 0° at an ulitmate pressure of 1 mm. The colorless liquid weighed 43.6 g. (100% of theory), assayed 93.5% based on "active oxygen" content, and was shock-sensitive at ½ inch.

EXAMPLE X

O,O-benzoyl O-benzyl monoperoxycarbonate

Into the reactor described in Example V was charged 63.6 g. (0.6 mole) of benzaldehyde, 85 g. (0.5 mole) of benzyl chloroformate, 53 g. (0.5 mole) of sodium carbonate and 75 ml. of benzene. Oxygen was bubbled in at the rate of 3.0 liters per hour for seven hours. The reactor was illuminated by a 300 watt reflector spot lamp. The temperature of the reaction mixture was maintained at 15–25° C. by circulating water through the jacket of the reactor. The inorganic salts were separated by filtration, the filter cake was washed with 100 ml. of benzene and the combined filtrates were stripped in vacuo in a rotating evaporator at 30° C. at 4 mm. pressure. The residue, weighing 140.3 g., crystallized after storage at −15° C. for 18 hours. The crystalline product was filtered, washed with 100 ml. of pentane, and air-dried. The product weighed 45.7 g. (33.5% of theory), assayed 98.5% based on "active oxygen" content, and melted at 66–69° C.

Additional product was obtained from the mother liquors.

EXAMPLE XI

O,O-n-butyryl O-isobutyl monoperoxycarbonate

Into the reactor described in Example V is charged 14.4 g. (0.2 mole) of n-butyraldehyde, 19 g. (0.18 mole) of sodium carbonate, 20.5 g. (0.15 mole) of isobutyl chloroformate and 75 ml. of ethyl acetate. The reaction mixture was kept at 8–9° C., while oxygen was bubbled in at the rate of 1.8 liters per hour for fourteen hours. The inorganic solids were removed by filtration and the filtrate stripped on a rotating evaporator at an ultimate pressure of 2 mm.

The residue weighed 20.3 g. (66.5% of theory) and assayed 86% based on "active oxygen" content. The liquid was then diluted with an equal volume of pentane and washed at 3–5° C. with three 50 ml. portions of water. The pentane solution was dried over 5 g. of magnesium sulfate, filtered, and stripped on a rotating evaporator, leaving 17.5 g. of colorless oil assaying 92.4% based on "active oxygen" content.

EXAMPLE XII

O,O-acetyl O-benzyl monoperoxycarbonate

Into the reactor described in Example IV was charged 11.0 g. (0.25 mole) of acetaldehyde, 34 g. (0.20 mole) of benzyl chloroformate, 21.2 g. (0.20 mole) of sodium carbonate and 50 ml. of ethyl acetate. Oxygen was bubbled in at the rate of 1.5 liters per hour for twelve hours. During the oxidation the reaction mixture temperature was kept at 15–20° C.

The inorganic salts were removed by filtration and the filtrate was stripped in vacuo on a rotating evaporator until there was no further weight loss from the product. The oily product weighed 34.6 g. (82.5% of theory) and assayed 70.7% based on "active oxygen" content.

EXAMPLE XIII

O,O-benzoyl O-phenyl monoperoxycarbonate

Into the reactor described in Example IV was charged 39.1 g. (0.25 mole) of phenyl chloroformate, 31.8 g. (0.3 mole) of benzaldehyde, 31.8 g. (0.30 mole) of sodium carbonate and 60 ml. of ethyl acetate. Oxygen was bubbled in at the rate of 4.5 liters per hour for eleven hours. The temperature was kept at 7–10° C.

The reaction mixture then was filtered and the filtrate stripped in vacuo on a rotating evaporator. The residue was recrystallized from pentane at −12° C. The crystalline product weighed 20 g. (31% of theory), assayed 98.0% based on "active oxygen" content and melted at 49–50° C. [Reported, 50° C. (13)].

EXAMPLE XIV

Benzoyl peroxide

Into the reactor described in Example V was charged 63.6 g. (0.6 mole) of benzaldehyde, 70.3 g. (0.5 mole) of benzoyl chloride, 53 g. (0.5 mole) of sodium carbonate and 75 ml. of benzene. The reactor was illuminated with a 300 watt reflector spot lamp. Oxygen was bubbled into the reactor at the rate of 3 liters per hour for 6 hours. The reaction temperature was 25–30° C.

The reaction mixture was filtered and the filter cake washed well with 250 ml. of benzene to extract any benzoyl peroxide which may have coprecipitated with the inorganic salts. The filtrate was then stripped on a rotating evaporator at an ultimate pressure of 1 mm. The residue was cooled to −15° C. and the crystalline benzoyl peroxide was removed by filtration and washed well with cold pentane. The yield of benzoyl peroxide was 32.9 g. (28.0% of theory) and assayed 98% based on active oxygen content.

Additional benzoyl peroxide was isolated from the mother liquors.

EXAMPLE V

Benzenesulfonyl benzoyl peroxide

Into the reactor described in Example IV was charged 15.8 g. (0.15 mole) of benzaldehyde, 22.9 g. (0.13 mole) of benzenesulfonyl chloride, 16 g. (0.15 mole) of sodium carbonate and 75 ml. of ethyl acetate. The reaction mixture was cooled to −10° C. and oxygen bubbled in at the rate of 0.9 liter per hour for seven hours.

The reaction mixture was filtered at −5° C. and the filtrate stripped in vacuo at −5°. The dark red oil product assayed only 35% based on "active oxygen" content. All attempts to purify the product were unsuccessful. The peroxide is very unstable and decomposes even at 0° C.

EXAMPLE XVI

O,O-benzoyl O-isopropyl monoperoxycarbonate

Into the reactor described in Example IV was charged 18.04 g. (0.17 mole) of benzaldehyde, 18.38 g. (0.15 mole) of isopropyl chloroformate, 15.9 g. (0.15 mole) of sodium carbonate and 40 ml. of ethyl acetate.

Oxygen was bubbled in at the rate of 1.5 liters per hour for seven hours. The reaction mixture was filtered and the filtrate concentrated in vacuo on a rotating evaporator to 30.2 g. (92.7% of theory) of a pale yellow liquid. On standing at 0° for three days, a solid crystallized out of the oil and was filtered off, washed with cold pentane and air dried. The colorless solid (8.5 g.) assayed 96.6% based on "active oxygen" content and melted at 56° [(Reported 56–58° C. (12)].

EXAMPLE XVII

O,O-benzoyl O-isobutyl monoperoxycarbonate $$\Phi-\overset{O}{\overset{\|}{C}}OO\overset{O}{\overset{\|}{C}}OCH_2CH(CH_3)_2$$

Oxygen was bubbled into a mixture of 20.3 g. (0.15 mole) of isobutyl chloroformate 18 g. (0.17 mole) of benzaldehyde, 15.9 g. (0.15 mole) of sodium carbonate and 40 ml. of ethyl acetate. The reaction temperature was 25°.

The product was worked up in the usual manner. From the crude peroxidic product was obtained 11 g. of liquid O,O-benzoyl O-isobutyl monoperoxycarbonate, which assayed 89% based on active oxygen content.

EXAMPLE XVIII

Other peroxides prepared by this process are summarized in the following table:

| Peroxide | Percent assay | Physical state |
|---|---|---|
| 1. Acetyl p-anisoyl peroxide $CH_3O-\Phi-\overset{O}{\overset{\|}{C}}OO\overset{O}{\overset{\|}{C}}CH_3$ | 99.0 | Solid, M.P. 59.5–60.5° C. |
| 2. Acetyl hexahydrobenzoyl peroxide $CH_3\overset{O}{\overset{\|}{C}}-OO\overset{O}{\overset{\|}{C}}-\langle S \rangle$ | 100.0 | Solid, M.P. 41.5–42° C. |
| 3. Acetyl 2-methylundecanoyl peroxide $CH_3-\overset{O}{\overset{\|}{C}}-OO-\overset{O}{\overset{\|}{C}}-\overset{CH_3}{\overset{|}{CH}}-(CH_2)_8-CH_3$ | 59.9 | Liquid. |

TABLE—Continued

| Peroxide | Percent assay | Physical state |
|---|---|---|
| 4. Acetyl 2-ethylhexanoyl peroxide $CH_3-\overset{O}{\overset{\|}{C}}-OO-\overset{O}{\overset{\|}{C}}-\overset{C_2H_5}{\overset{\|}{CH}}-C_4H_9$ | 95.4 | Liquid. |
| 5. Acetyl isononanoyl peroxide (VII) | 88.1 | Liquid. |
| 6. Acetyl lauroyl peroxide $CH_3-\overset{O}{\overset{\|}{C}}-OO-\overset{O}{\overset{\|}{C}}-(CH_2)_{10}-CH_3$ | 80.4 | Solid, M.P. 28–33° C. |
| 7. Acetyl 2-methylvaleryl peroxide $CH_3\overset{O}{\overset{\|}{C}}OO\overset{OCH_3}{\overset{\|}{C}}CHC_3H_7$ | 89.5 | Liquid. |
| 8. Benzoyl propionyl peroxide $C_6H_5\overset{O}{\overset{\|}{C}}OO\overset{O}{\overset{\|}{C}}C_2H_5$ | 99.5 | Liquid. |
| 9. Benzoyl hexahydrobenzoyl peroxide $C_6H_5\overset{O}{\overset{\|}{C}}OO\overset{O}{\overset{\|}{C}}-\langle S \rangle$ | 98.7 | Solid, M.P. 49–51° C. |
| 10. O,O-butyryl O-isopropyl monoperoxycarbonate (XII) | 80 | Liquid. |
| 11. O,O-butyryl O-benzyl monoperoxycarbonate $C_3H_7\overset{O}{\overset{\|}{C}}OO\overset{O}{\overset{\|}{C}}OCH_2-\Phi$ | 57 | Liquid. |
| 12. O,O-butyryl O-phenyl monoperoxycarbonate $C_3H_7\overset{O}{\overset{\|}{C}}OO\overset{O}{\overset{\|}{C}}O-\Phi$ | 35 | Liquid. |
| 13. Diacetyl terephthaloyl diperoxide $CH_3\overset{O}{\overset{\|}{C}}OO\overset{O}{\overset{\|}{C}}-\Phi-\overset{O}{\overset{\|}{C}}OO\overset{O}{\overset{\|}{C}}CH_3$ | 90.2 | Solid. |
| 14. Dibenzoyl terephthaloyl diperoxide $C_6H_5\overset{O}{\overset{\|}{C}}OO-\overset{O}{\overset{\|}{C}}\Phi-\overset{O}{\overset{\|}{C}}OO\overset{O}{\overset{\|}{C}}C_6H_5$ | 99.2 | Solid, M.P. 140° C.[1] |

[1] Decomp.

EXAMPLE XIX

In order to demonstrate that peroxides having a wide range of thermal stabilities can be prepared by the process, the half-lives of several of the peroxides, described in the preceding examples were determined. Dilute benzene solutions, usually 0.2 molar in peroxide, were prepared; aliquots were sealed into glass tubes and the glass tubes were immersed in constant temperature baths. Samples were periodically withdrawn and were assayed for "active oxygen" content by standard analytical procedures. All the peroxides tested followed first order decomposition kinetics. The half-lives are listed below.

SELECTED HALF LIVES OF PEROXIDES

| Peroxide | Temp. (° C.) | $t_{1/2}$ (hrs.) |
|---|---|---|
| Acetyl benzoyl peroxide | 60 | 24.5 |
| | 70 | 7.4 |
| | 85 | 1.0 |
| Acetyl p-anisoyl peroxide | 70 | 5.0 |
| Acetyl 2-ethylhexanoyl peroxide | 30 | 6.0 |
| Acetyl hexahydrobenzoyl peroxide | 40 | 3.9 |
| | 50 | 1.0 |
| Acetyl 2-methylvaleryl peroxide | 30 | 10.0 |
| Acetyl lauroyl peroxide | 70 | 5.9 |
| Acetyl isononanoyl peroxide | 70 | 4.7 |
| Acetyl 2-methylundecanoyl peroxide | 30 | 9.6 |
| Dibenzoyl peroxide | 70 | 13.2 |
| | 80 | 4.3 |
| Benzoyl propionyl peroxide | 70 | 7.5 |
| Benzoyl butyryl peroxide | 60 | 23.7 |
| | 70 | 6.3 |
| | 85 | 0.94 |

SELECTED HALF-LIVES OF PEROXIDES—Continued

| Peroxide | Temp. (° C.) | $t_{1/2}$ (hrs.) |
|---|---|---|
| Benzoyl isobutyryl peroxide | 40 | 1.9 |
|  | 50 | 0.64 |
| Di-n-butyryl peroxide | 70 | 4.3 |
| m-Chlorobenzoyl o-chlorobenzoyl peroxide | 60 | 14.2 |
| m-Trifluoromethylbenzoyl benzoyl peroxide | 85 | 2.6 |
| O,O-benzoyl O-isopropyl monoperoxycarbonate | 70 | 4.5 |
| O,O-benzoyl O-isobutyl monoperoxycarbonate | 60 | 4.0 |
| O,O-benzoyl O-phenyl monoperoxycarbonate | 50 | 14.3 |
| O,O-benzoyl O-benzyl monoperoxycarbonate | 60 | 4.5 |
| O,O-butyryl O-isobutyl monoperoxycarbonate | 70 | 2.4 |
| Dibenzoyl succinoyl diperoxide | 70 | 9.3 |
| Anisoyl 2-ethylhexanoyl peroxide | 30 | 3.4 |

EXAMPLE XX (Styrene polymerization)

In the table are summarized styrene polymerization data for a selected number of the peroxides prepared by this process. It should be noted that many of these peroxides are far more efficient than commonly used, commercially available peroxides. This process now provides an economic process for preparing these peroxides.

| Initiator | Polymerization Temp. (° C.) | Rate ($\times 10^{-3}$)* |
|---|---|---|
| Acetyl benzoyl peroxide | 70 | 5.50 |
| O,O-benzoyl O-isobutylmonoperoxycarbonate | 70 | 3.46 |
| O,O-benzoyl O-benzylmonoperoxycarbonate | 60 | 4.07 |
| m-Chlorobenzoyl o-chlorobenzoyl peroxide | 60 | 2.51 |
| O,O-benzoyl O-isopropylmonoperoxycarbonate | 70 | 5.19 |
| Anisoyl acetyl peroxide | 70 | 6.40 |
| m-Trifluoromethylbenzoyl benzoyl peroxide | 85 | 11.52 |
| Acetyl lauroyl peroxide | 70 | 4.01 |
| Benzoyl butyryl peroxide | 70 | 3.46 |
| O,O-butyryl O-isobutylmonoperoxycarbonate | 70 | 4.66 |
| Dibenzoyl succinoyldiperoxide | 70 | 2.91 |

*10% conversion, mole/liter/minute.

EXAMPLE XXI (Curing of unsaturated polyester resin)

The diacyl peroxides and monoperoxycarbonates containing an aromatic moiety are especially useful as curing agents in promoted and unpromoted systems for polyester resins. The S.P.I. data for both promoted and unpromoted systems using peroxides prepared by our process are summarized in the tables.

TABLE (XXIa) UNPROMOTED CURING OF BASIC POLYESTER RESIN

[Conditions: 1% by weight of peroxide; $t=82°$ C.]

| Curing agent | Time (min.) Gel | Time (min.) Cure | Peak temp. (° F.) | Barcol hardness |
|---|---|---|---|---|
| Benzoyl peroxide | 5.4 | 7.5 | 400 | 40–45 |
| O,O-benzoyl O-isobutyl monoperoxycarbonate | 5.4 | 7.4 | 404 | 30–40 |
| O,O-benzoyl O-benzyl monoperoxycarbonate | 3.6 | 5.8 | 400 | 30–40 |
| O,O-benzoyl O-isopropyl monoperoxycarbonate | 1.9 | 3.1 | 418 | 45–50 |
| Acetyl benzoyl peroxide | 2.8 | 4.2 | 415 | 40–45 |
| Benzoyl butyryl peroxide | 4.3 | 6.3 | 394 | 35–45 |
| Benzoyl propionyl peroxide | 3.2 | 5.0 | 403 | 35–45 |
| m-Trifluoromethylbenzoyl benzoyl peroxide | 21.6 | 24.1 | 394 | 20–30 |
| m-Chlorobenzoyl o-chlorobenzoyl peroxide | 7.3 | 9.1 | 384 | 15–25 |
| Anisoyl acetyl peroxide | 2.1 | 3.5 | 416 | 45–55 |

TABLE (XXIb) PROMOTED CURING OF BASIC POLYESTER RESIN

[Condition: 1% by weight of peroxide; 0.1% by weight of N,N-dimethyltoluidine]

| Curing agent | Cure temp. (° C.) | Time (min.) Gel | Time (min.) Cure | Peak temp. (° F.) | Barcol hardness |
|---|---|---|---|---|---|
| Benzoyl peroxide | [1]R.T. | 7.5 | 13.4 | 277 | 40–50 |
|  | 30 | 5.9 |  |  |  |
| O,O-benzoyl O-isobutyl monoperoxycarbonate | R.T. | 7.8 | 12.6 | 285 | 40 |
|  | 30 | 4.1 |  |  |  |
| O,O-benzoyl O-benzyl monoperoxycarbonate | R.T. | 2.1 | 5.3 | 272 | 35–40 |
|  | 30 | ca. 0 |  |  |  |
| O,O-benzol O-isopropyl monoperoxycarbonate | R.T. | 9.2 | 16.9 | 230 | 25–30 |
|  | 30 | 4.8 |  |  |  |
| Acetyl benzoyl peroxide | R.T. | 12.3 | 18.1 | 305 | 45–50 |
|  | 30 | 7.5 |  |  |  |
| Benzoyl n-butyryl peroxide | R.T. | 12.3 | 18.2 | 280 | 45–55 |
|  | 30 | 6.9 |  |  |  |
| Benzoyl propionyl peroxide | R.T. | 11.5 | 16.8 | 298 | 50–40 |
|  | 30 | 6.5 |  |  |  |
| m-Trifluoromethylbenzoyl benzoyl peroxide | R.T. | 4.5 | 8 | 264 | 50–50 |
|  | 30 | 1.0 | 1.8 |  |  |
| m-Chlorobenzoyl o-chlorobenzoyl peroxide | R.T. | 2.5 | 5.3 | 216 | 0 |
|  | 30 | ca. 0 |  |  |  |
| Anisoyl acetyl peroxide | R.T. | 23.4 | 34.6 | 270 | 45–55 |
|  | 30 | 13.3 |  |  |  |

[1] R.T.=room temperature (about 22° C.).

EXAMPLE XXII

Dibenzoyl succinoyl diperoxide

Into the reactor described in Example IV was charged 20.2 g. (0.13 mole) of succinyl chloride, 31.8 g. (0.30 mole) of benzaldehyde, 27.5 g. (0.26 mole) of sodium carbonate and 75 ml. of benzene. The reactor was illuminated by a 300 watt reflector spot lamp and oxygen was bubbled in at the rate of 1.5 liters per hour for six hours. The reaction mixture was filtered and the filter cake was washed with 150 ml. of benzene.

The filtrate was stripped in vacuo on a rotating evaporator. The off-white solid residue weighed 49.6 g. (107% of theory) and assayed 84.5% based on "active oxygen" content.

The product was recrystallized from methanol as glistening colorless needles which melted at 121–23° C., assayed 100% and was shock sensitive at two inches.

EXAMPLE XXIII

Benzoyl N,N-dimethylcarbamoyl peroxide

Into the reactor described in Example IV was charged 14.35 g. (0.15 mole) of dimethylcarbamoyl chloride, 18.04 g. (0.17 mole) of benzaldehyde, 24 g. of dried "Rexyn 206," a weak base organic anion exchange resin, and 40 ml. of ethyl acetate. The reaction mixture was cooled to 0° by circulating cold brine through the reactor jacket. Oxygen was bubbled into the mixture at the rate of 1.7 liters per hour for four hours. The stirring was stopped, the anion exchange resin was allowed to settle. A 1.0 ml. sample of the supernatant liquid was added to an iodine flask containing 20 ml. of acetic acid and 5 g. of sodium iodide. The flask was stoppered and placed in the dark for thirty minutes. The flask was then unstoppered, 50 ml. of deoxygenated water added and the liberated iodine titrated with 0.1 N sodium thiosulfate. The titration required 17.5 ml. Since the total volume of liquid reaction mixture was 70 ml., the conversion to benzoyl N,N-dimethylcarbamoyl peroxide was 40%.

This peroxide is very unstable, decomposing completely within sixteen hours at —15° C. This peroxide is not isolated, but is generated in situ when used as an initiator.

Thus, having described the invention, what is claimed is:

1. In a process for preparing a peroxy compound which comprises the steps of:
   (a) introducing free oxygen into an intimate mixture of an aldehyde, an organic active halogen compound and an acid acceptor, at a temperature below the decomposition temperature of the peroxy compound; and (b) recovering from the reaction mixture a peroxy compound, where:
(1) said aldehyde has the formula $R(CHO)_{1-2}$ where R is inert to said halogen compound, is free of olefinic bonds and is selected from $C_1$–$C_{22}$ alkyl, cycloalkyl, aryl, aralkyl, alkylene, cycloalkylene, arylene and the corresponding substituted radicals;
(2) said halogen compound is free of olefinic bonds and is selected from

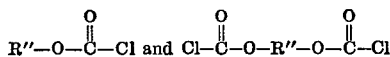

where R″ is $C_1$–$C_{22}$ alkyl, cycloalkyl, aralkyl, aryl or a corresponding substituted radical and may be the same as R; and
(3) said acid acceptor is selected from alkali metal carbonate, alkaline earth metal carbonate, magnesium oxide, zinc oxide and basic organic ion exchange resin; the improvement which comprises:
(A) carrying out step (a) under anhydrous conditions; and
(B) using an amount of said acceptor sufficient to react with hydrogen halide released during the peroxy compound formation reaction without producing free water.

2. The process of claim 1 wherein said aldehyde and halogen compound are present in amounts such that there is about a 1:1 molar ratio of aldehydo (—CHO) to chloro (—Cl) groups, and said free-oxygen introduction is continued until oxygen absorption ceases.

3. The process of claim 1 wherein said temperature is from about —25° C. to about +50° C.

4. The process of claim 1 wherein said acid acceptor is present in a slight excess over the amount required to react with acid released during said reaction.

5. A process for preparing O,O-benzoyl O-benzyl monoperoxycarbonate which comprises:
(a) introducing oxygen into an intimate mixture of benzaldehyde, benzyl chloroformate and sodium carbonate in benzene solvent, under anhydrous conditions and in the presence of illumination until oxygen absorption ceases, while maintaining the reaction temperature at 15–25° C. and
(b) recovering O,O-benzoyl O-benzyl monoperoxycarbonate product from the reaction product mixture.

References Cited

UNITED STATES PATENTS 3,108,093  10/1963  Pajaczkowski et al. ___ 260—89.5

OTHER REFERENCES

Chemical Abstracts, vol. 68, 39292a (1968).

LEWIS GOTTS, Primary Examiner

D. G. RIVERS, Assistant Examiner

U.S. Cl. X.R.

260—551 R, 607 A, 610 B, 610 D, 934